March 25, 1930.  J. DOMENJOZ  1,752,241
AIRCRAFT
Filed July 6, 1928  3 Sheets-Sheet 2
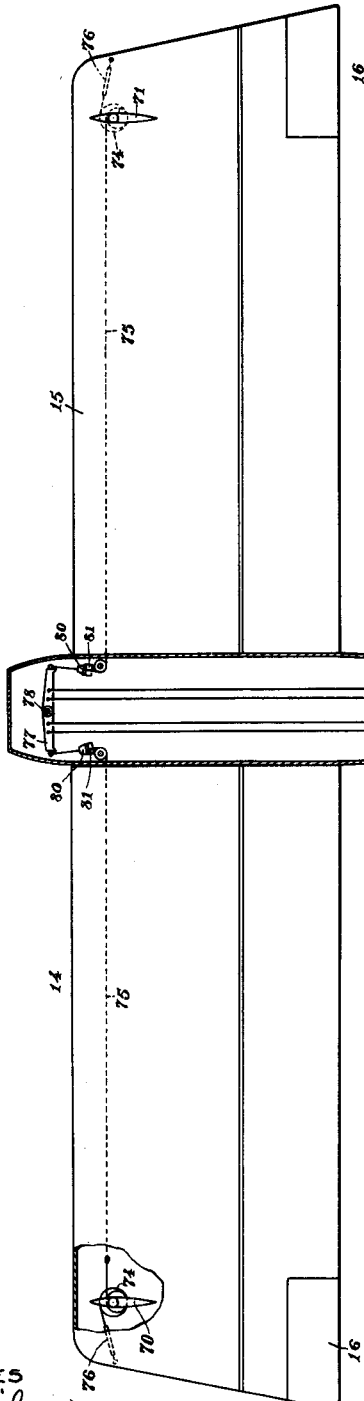
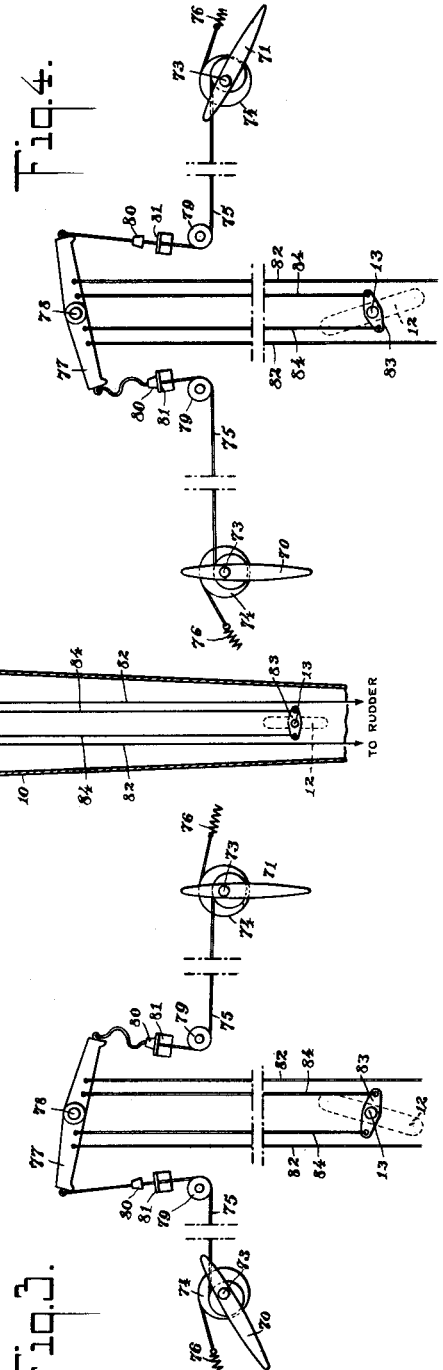
INVENTOR
John Domenjoz
BY
ATTORNEY

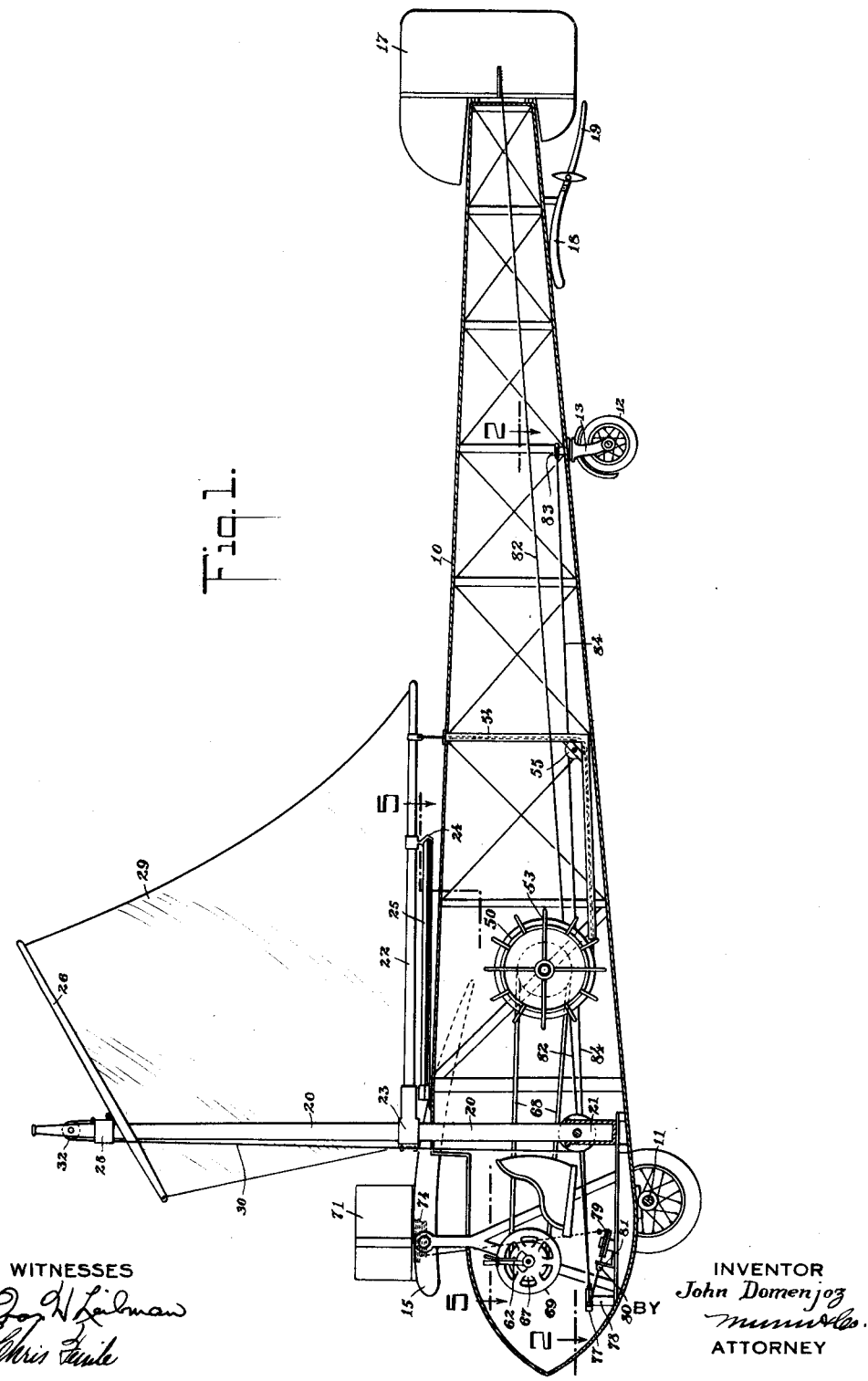

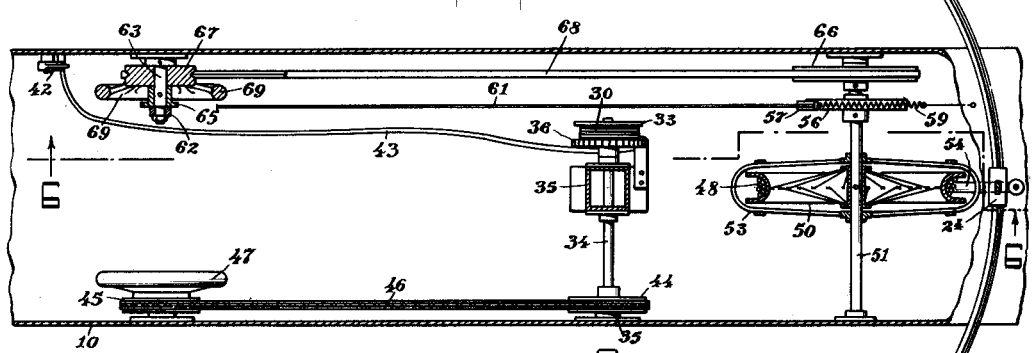
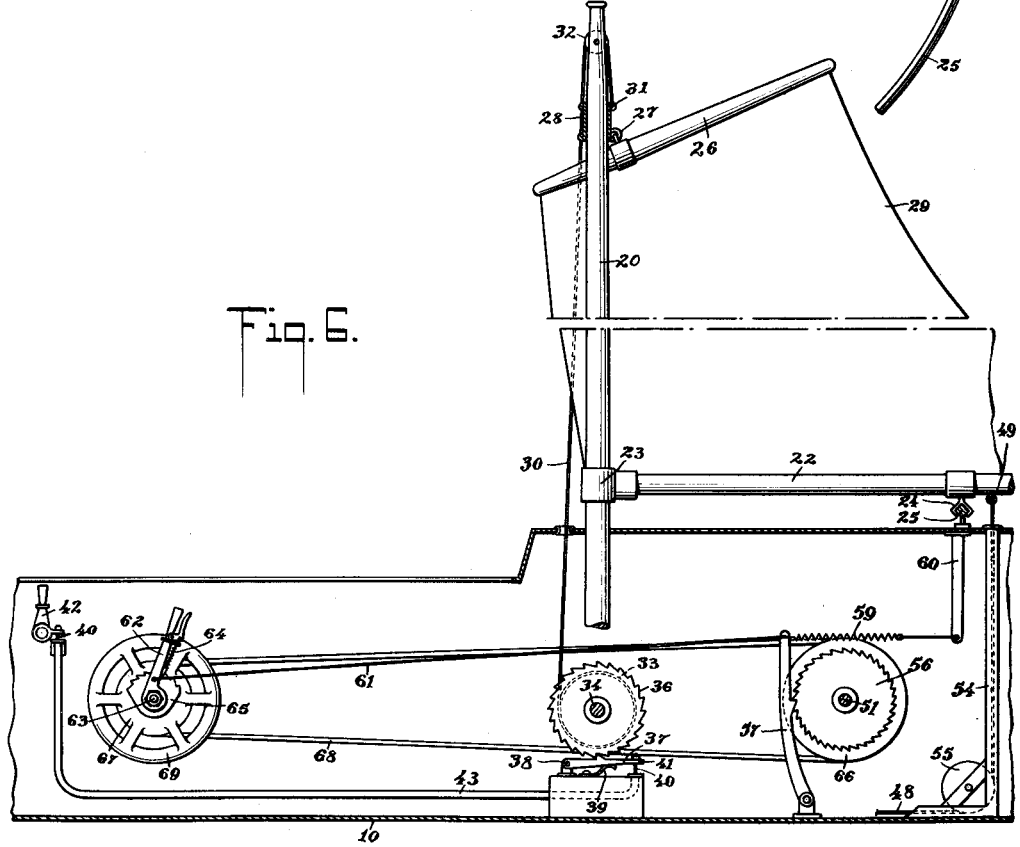

Patented Mar. 25, 1930

1,752,241

UNITED STATES PATENT OFFICE

JOHN DOMENJOZ, OF NEW YORK, N. Y., ASSIGNOR TO DOMENJOZ SAIL PLANE CO., OF NEW YORK, N. Y., A CORPORATION OF NEW YORK

AIRCRAFT

Application filed July 6, 1928. Serial No. 290,770.

This invention relates to an aircraft, and relates more particularly to an aircraft adapted to use the wind or air currents only to obtain motion of the craft.

One of the objects of the invention is to provide an aircraft of the indicated character with novel means for handling or maneuvering the craft, in "taking off", and while the craft is in flight, and for landing the craft.

Another object of the invention is the provision in an aircraft of a noval arrangement of airfoils and controlling means therefor, designed and adapted to be operated by a pilot for the purpose of compensating for flow changes of the air currents, while the craft is in flight, to obtain the desired stability and direction of the craft, and also an effective dynamic reaction of the airfoils to the air currents.

With the foregoing and other objects in view, the invention resides in the particular provision, relative disposition, and operation of the parts hereinafter fully described and illustrated in the accompanying drawings, in which—

Figure 1 is a longitudinal sectional view of the aircraft embodying the features of the present invention.

Figure 2 is a sectional view taken on the line 2—2 of Fig. 1.

Figure 3 is a diagrammatic view of the movable stabilizers or front rudders, the tail wheel, and operating means, the parts being shown disposed for navigating the craft to the left.

Figure 4 is a view similar to Figure 3, but showing the parts relatively disposed for navigating the craft to the right.

Figure 5 is a sectional view taken on the line 5—5 of Fig. 1, on an enlarged scale.

Figure 6 is a sectional view taken on the line 6—6 of Fig. 5.

Referring now more particularly to the drawings, it will be apparent that, the aircraft includes a fuselage 10 having a landing gear 11 at the front including ground wheels, and a tail wheel 12 mounted for rotation in a fork 13 turnably mounted on the frame of the fuselage 10. The fuselage 10 is provided on the fore part thereof and extending transversely with respect thereto a main lifting plane which provides laterally disposed left and right wings 14 and 15 respectively. Each of the wings 14 and 15 is provided with the usual aileron 16. The tail of the fuselage 10 is provided with a rudder 17, and fixed and movable horizontal stabilizers 18 and 19 respectively. It is to be understood that the craft will be provided with well known forms of control means for the purpose of operating the ailerons 16 and stabilizers 19, which control means has been omitted from the drawings for the sake of convenience and clearness.

In order to impart translatory movement to the craft there is provided novel means presently to be described. A mast 20 is arranged fore of the fuselage 10, the lower end of the mast being anchored in a socket 21 anchored to the framework of the fuselage 10 at the bottom. The mast 20 projects upwardly substantially perpendicular to the longitudinal axis of the fuselage 10. A beam 22 is connected at one end, as at 23 with the mast 20. The beam 22 has connected therewith a slide 24 which runs on a track or rail 25 fixedly connected with portions of the framework of the fuselage; the said track or rail 25 being arcuate, the arc of which is struck from the axis of the mast 20. A gaff 26 is loosely connected as at 27 with a collar 28 arranged for up and down movement on the upper end of the mast 20. A sheet of canvas or like material constituting an airfoil in the form of a sail 29 is attached in any suitable manner to the beam 22 and to the gaff 26. In order to reef and also to lengthen the sail 29, the gaff 26 is moved up and down, and this is accomplished by means and in a manner presently to be described. One end of a flexible cable or the like 30 is connected with the collar 28 as at 31, passes around a sheave 32 on the mast 20, and the opposite end of said cable 30 is wrapped around a drum or spool 33 mounted on a shaft 34, supported for rotation by suitable bearings 35 on the framework of the fuselage. A ratchet wheel 36 is fast with the spool 33, and cooperating with the teeth of the ratchet wheel 36 is a ratchet member 37 pivotally mounted at one end as at 38. The member 37 is under the influence of a spring 39 which has a normal tendency to yieldably hold the member 37 in engagement with one of the teeth of the wheel 36 to prevent the gaff 26 from lowering under its own weight and the weight of the sail. The ratchet member 37 is operated by a flexible member or cable 40, one end of which is connected as at 41 with the member 37, and the opposite end of the cable 40 is connected with a hand lever 42 operatively arranged on the inside of the pilot's compartment. The cable 40 extends through a guide tube 43 held in place in any suitable manner. The shaft 34 has a sprocket wheel 44. A sprocket wheel 45 is rotatable on a stub shaft projecting inwardly from the framework of the fuselage. A chain 46 encircles the sprocket wheels 44 and 45. A hand wheel 47 is secured to the sprocket wheel 45. It will now be understood that when the lever 42 is manipulated to disengage the ratchet member 37, the collar 28 may slide down on the mast 20, and as a consequence the gaff 26 will move downwardly, thereby giving fullness to the sail 29. By manipulating the hand wheel 47, the collar 28 may be slid upwardly, through the intervention of the sprocket wheels 44 and 45, the chain 46, shaft 34, spool 33, and cable 30. In this way the sail 29 is lengthened or made trim.

In order to shift the position of the sail 29 for the purpose of tacking, there is provided control means presently to be described. A flexible member such as a cable 48 has one end thereof connected with the beam 22 as at 49, the opposite end thereof is wrapped around a grooved wheel 50 fast on a shaft 51 supported for rotation in suitable bearings 52 secured to the framework of the fuselage 10. A guard 53 is associated with the wheel 50 to prevent the cable 48 from being fouled or tangled. The cable 43 passes through a guide 54 and around a pulley 55. A ratchet wheel 56 is fast on the shaft 51. A ratchet member 57 cooperates with the teeth of the ratchet wheel 56. One end of the member 57 is pivotally connected as at 58. The upper end of the member 57 has connected therewith one end of a tension spring 59, and the opposite end of said spring is connected with a fixed member 60. The spring 59 has a normal tendency to yieldably hold the member 57 in engagement with one of the teeth of the ratchet wheel 56. The member 57 is disengaged by means of a cable or the like 61 connected at one end of the member 57 and the opposite end of said cable being connected with a hand lever 62 having as a fulcrum, a stub shaft 63 supported by the framework of the fuselage 10. The lever 62 carries a spring pressed latch 64 which coacts with a toothed sector 65 secured to the shaft 63. A sheave 66 is fast on the shaft 51, and a sheave 67 is loose on the shaft 63, and a belt 68 encircles the sheaves 66 and 67. The sheave 67 is provided with a hand wheel 69. It will now be understood that when the lever 62 is manipulated to exert a pull on the cable 61, the ratchet member 57 will be disengaged from the ratchet wheel 56. This will allow the sail to shift its position under the action of the wind, and incidentally the beam 22 will exert a pull on the cable 48 unwinding the same from the wheel 50, this action being permitted because of the fact that the ratchet member 57 is disengaged. It will also be understood that the hand wheel 69 may be operated to swing the beam 22 to shift the position of the sail 29. This is accomplished through the intervention of the sheaves 66 and 67, belt 68, shaft 51, and the wheel 50, on which the cable 48 will be wound.

In order to supplement the effect of the sail 29 and the main rudder 17 there are provided auxiliary rudders or vertical stabilizers 70 and 71 respectively arranged on the top of the wings 14 and 15. Each of the stabilizers 70 and 71 is mounted for pivotal movement as indicated at 73. A sheave 74 having a spiral groove is connected with the pivot of each stabilizer 70 and 71, and a flexible member or cable 75 is wrapped around the sheave 74 and has one end thereof connected with a tension spring 76 on the wing, and the opposite end of the cable is connected with a bar 77 pivotally mounted as at 78 on the bottom of the cockpit. The cable 75 is trained over suitable pulleys, one of which is indicated at 79. The cable 75 has a stop 80 which encounters a fixed stop 81 for the purpose of limiting pivotal movement of the related stabilizer to a position substantially parallel with the longitudinal axis of the fuselage. Each of the stabilizers 70 and 71 is returned to its normal position by the action of its related spring 76. Each of the stabilizers 70 and 71 is movable from its normal position to any position within the range of a 45° angle. The rudder 17 is operated by cables 82 or the like connected with the rudder 17 and the bar 77. On reference to Fig. 3 it will be apparent, that when the part 77 is moved to one position for directing the craft to the left, the rudder 17 and the auxiliary rudder or stabilizer 70 will be moved simultaneously to angular positions with respect to the longitudinal axis of the fuselage or line of flight. Similarly, when the bar 77 is moved in an opposite direction to navigate or direct the craft to the right, the rudder 17 and the auxiliary rudder or stabilizer 71 will be moved simultaneously for this purpose. When the craft is on the ground and it is turned to the right or left, the tail wheel 12 will be moved to allow the tail of the craft to swing in a corresponding direction. This is accomplished by providing the fork 13 with a bar 83 rigidly connected therewith. To the opposite ends of the bar 83 respectively, are connected cables 84 or like elements which are also connected with the bar 77.

The aircraft having the features described is adapted to fly with the wind. When the sail 29 takes to the wind the craft will travel in a forward direction on the wheels of the landing gear 11 and the tail wheel 12. The effect of the sail 29 to produce forward translatory movement of the craft is supplemented by the effect of the rudder 17 and either one of the auxiliary rudders or stabilizers 70 and 71 properly set to give craft the proper direction and stability, said rudder and stabilizer being acted on by quartering currents of air. After attaining a certain amount of headway, the horizontal stabilizers 19 may be set to raise the tail until a flying speed is attained, whereupon the stabilizer 19 may be set for the "take off". The rush of air on the surfaces of the wings 14 and 15 will produce the necessary lifting action to put the craft in flight. Navigation of the craft while in flight is accomplished by maneuvering the sail, rudder, ailerons, and stabilizers according to the velocity and direction of the wind or currents of air. In descending, the craft may be glided by bringing the wings 14 and 15 at the proper angle to effect a landing. This is accomplished by operating control means (not shown) connected with the ailerons 16 and stabilizers 19; expedients well known in aircraft of this general construction.

It is to be understood that a hull may be substituted for the fuselage 10 in order to adapt the craft for travel on a body of water as well as in the air.

I claim:

1. In an aircraft, a fuselage, a rudder pivotally mounted on the tail of the fuselage, laterally extending wings on the fore part of the fuselage, vertical stabilizers respectively arranged on opposite sides of the fuselage, each of said stabilizers being mounted for pivotal movement, a pivotally mounted bar on the fuselage, and operative connections respectively between the bar and stabilizers and the bar and rudder for the purpose of simultaneously moving either one of the stabilizers and the rudder in response to the movement of the bar.

2. In an aircraft, a fuselage, a rudder pivotally mounted on the tail of the fuselage, laterally extending wings on the fore part of the fuselage, vertical stabilizers respectively arranged on opposite sides of the fuselage, each of said stabilizers being mounted for pivotal movement, a pivotally mounted bar on the fuselage, operative connections respectively between the bar and stabilizers and the bar and rudder for the purpose of simultaneously moving either one of the stabilizers and the rudder in response to the movement of the bar, a sail mounted on the fuselage, and means to maneuver said sail.

Signed at New York city, in the county of New York and State of New York, this 5th day of July, 1928.

JOHN DOMENJOZ.